United States Patent [19]
Umlas

[11] Patent Number: 5,519,184
[45] Date of Patent: May 21, 1996

[54] REUSABLE LASER WELDED HERMETIC ENCLOSURE AND METHOD

[75] Inventor: Michael P. Umlas, West Hills, Calif.

[73] Assignee: Litton Systems, Inc., Woodland Hills, Calif.

[21] Appl. No.: 246,679

[22] Filed: May 20, 1994

[51] Int. Cl.⁶ .................... B23K 26/00; B23K 26/02
[52] U.S. Cl. .................. 219/121.64; 219/121.63
[58] Field of Search ............. 219/121.6, 121.63, 219/121.64; 220/612; 228/262.5, 262.51, 262.9

[56] References Cited

U.S. PATENT DOCUMENTS

| | | | |
|---|---|---|---|
| 2,993,617 | 7/1961 | Briggs | 220/612 |
| 4,521,668 | 6/1985 | Osial et al. | 219/121 |
| 4,665,294 | 5/1987 | Hira et al. | 219/121 |
| 4,685,849 | 8/1987 | Labarge et al. | 413/22 |
| 5,049,421 | 9/1991 | Kosh | 428/34.4 |
| 5,132,776 | 7/1992 | Hanada et al. | 357/81 |

FOREIGN PATENT DOCUMENTS

| | | | |
|---|---|---|---|
| 58-223349 | 12/1983 | Japan | 219/121 |
| 58-223350 | 12/1983 | Japan | 219/121 |
| 59-161052 | 9/1984 | Japan | 219/121 |
| 60-31247 | 2/1985 | Japan | 219/121 |

*Primary Examiner*—Marvin M. Lateef
*Assistant Examiner*—J. Pelham
*Attorney, Agent, or Firm*—Wilfred G. Caldwell; James F. Kirk; Chester E. Martine

[57] ABSTRACT

The reusable welded hermetic enclosure and method provides a laser weld between a cover and a chassis to form an enclosure or a laser weld between two parts to form a hermetic seal. In either event, one part has an open mouth with a sloped or tapered external section surrounding the mouth to receive the larger mouth of the other part. The mouth of the other part is sloped or tapered to conform to the sloped or tapered external section of the first part. The parts are pressed together for an interference fit to eliminate gaps and the laser weld connects the sloped or tapered sections. When the materials to be welded are of low silicon content aluminum, it is necessary to include a filler ring of an aluminum-silicon alloy containing a predetermined silicon content between the sloped or tapered sections. The cover and the chassis are reusable after opening. The filler ring is sacrificed during the removal of the cover.

12 Claims, 5 Drawing Sheets

REUSABLE LASER WELDED HERMETIC ENCLOSURE AND METHOD

BACKGROUND OF THE INVENTION

1. Field of the Invention

The invention is a light weight enclosure or container which may house expensive electronics and/or instrumentation sealed against contamination, moisture and weather by employing laser welding in a unique process.

2. Prior Art

No successful prior art is known. Laser welded enclosures often fail hermetic testing, necessitating epoxy patching which is not durable. Some laser welded enclosures are known which do not permit reuse after opening.

More particularly, if the instrumentation is to be used in the aerospace field, weight becomes an important consideration, and the present invention may uniquely employ aluminum alloys, and still obtain perfect hermetic sealing.

SUMMARY OF THE INVENTION

The invention comprises a sealed enclosure or seal per se and methods of making the same wherein one part (the chassis) has an open mouth with a tapered surface surrounding the mouth adjacent thereto. The taper periphery is smallest at the mouth and increases in the direction of the bottom of the chassis or other end of the part.

A weld filler ring fits about at least a portion of the tapered surface and conforms thereto-preferably being conical.

A cover for the chassis (or the other part for the seal) has an open mouth capable of receiving the mouth of the chassis and a portion of the tapered surface, with the weld filler ring therebetween.

A laser weld connects the cover mouth (or other part mouth), ring, and tapered surface to effect a hermetic seal around the tapered surface. The level of hermeticity of the weld produced is substantially equivalent to the theoretical limits of the materials being joined. In practice, production enclosures have been made and sealed using the invention method and leak tested. No leaks were detected at the limit of the available factory measurement equipment which was $3*10^{-10}$ cc He/sec at one atmosphere pressure differential.

The preferred material for forming the seals is aluminum. The tapered surface may comprise A356.0-T6 aluminum alloy, the weld filler ring may be 4047 aluminum alloy and the cover mouth and adjacent region may be 6061 aluminum alloy.

The methods involve the forming of one part with an open mouth and an adjacent tapered surface with the other part formed with an open mouth large enough to receive the one part open mouth and at least a portion of the tapered surface, with the weld filler ring interposed between the tapered surface and the larger open mouth.

Laser welding then connects the larger mouth portion to the welding ring and tapered surface.

Also, the method of making an internally flared open ended cover is disclosed wherein the sheet from which the cover is made is drawn over a male die having an outwardly flared bottom portion. Then, a pinch-off die cutter separates the cover from the sheet by cutting the cover parallel with the die body so the flared portion of the cover is severed to provide the internal flaring for the cover.

Still further, the method of forming a conical shaped ring from sheet material is disclosed wherein given the top inside diameter of the conical ring (i.e., cone section), slope of the ring, height of the ring and angle of the tapered surface, it is possible to calculate the inside and outside diameters, as well as the length, of an arc which may form a pattern on sheet material to cut or punch out the ring which when its ends are laser welded together makes a weld filler ring which snugly fits or presses against the tapered surface so it is automatically maintained in place for further processing, while eliminating gaps. This is also true of the flared portion of the cover (or other part) when it fits snugly or tightly presses against the ring or tapered surface.

For materials other than aluminum, such as mu metal, stainless steel, and the like, no weld filler ring is required because these metals weld much more readily than aluminum.

BRIEF DESCRIPTION OF THE DRAWINGS

FIG. 1 is a view in side elevation of a hermetically sealed enclosure or container including a chassis and a cover;

DESCRIPTION OF THE PREFERRED EMBODIMENT

Figure 1A:
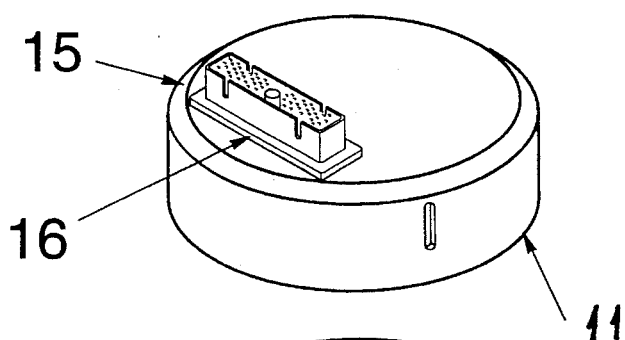
FIG. 1a is an isometric view of the cover with electrical connector.
Figure 1B:
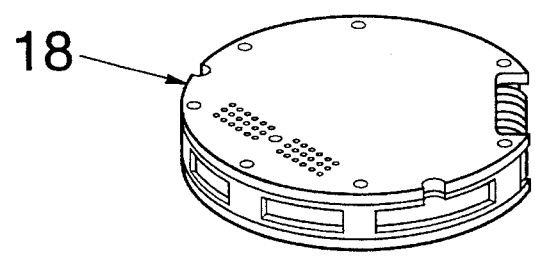
FIG. 1b is an isometric view of an electronics circuit card assembly to be contained in the enclosure.
Figure 1C:
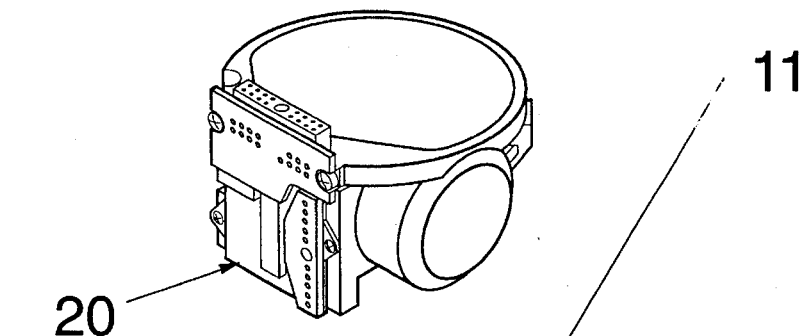
FIG. 1c is an isometric view of an instrument assembly to be contained in the enclosure.
Figure 1D:
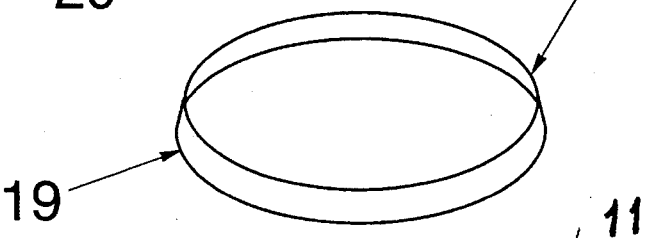
FIG. 1d is an isometric view of a weld filler ring integral with or for fitting onto a peripheral tapered surface of the chassis.
Figure 1E:
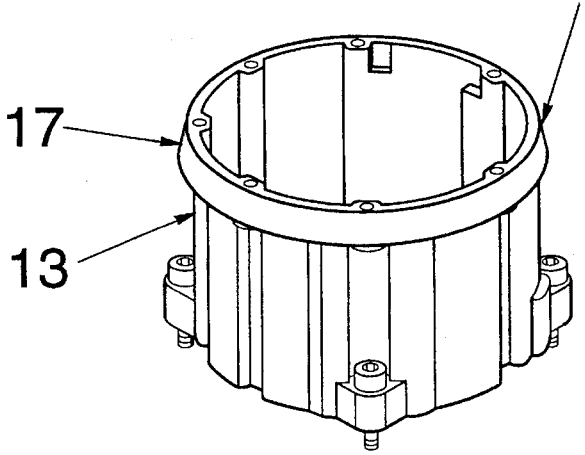
FIG. 1e is an open isometric view of the chassis.
Figure 2:
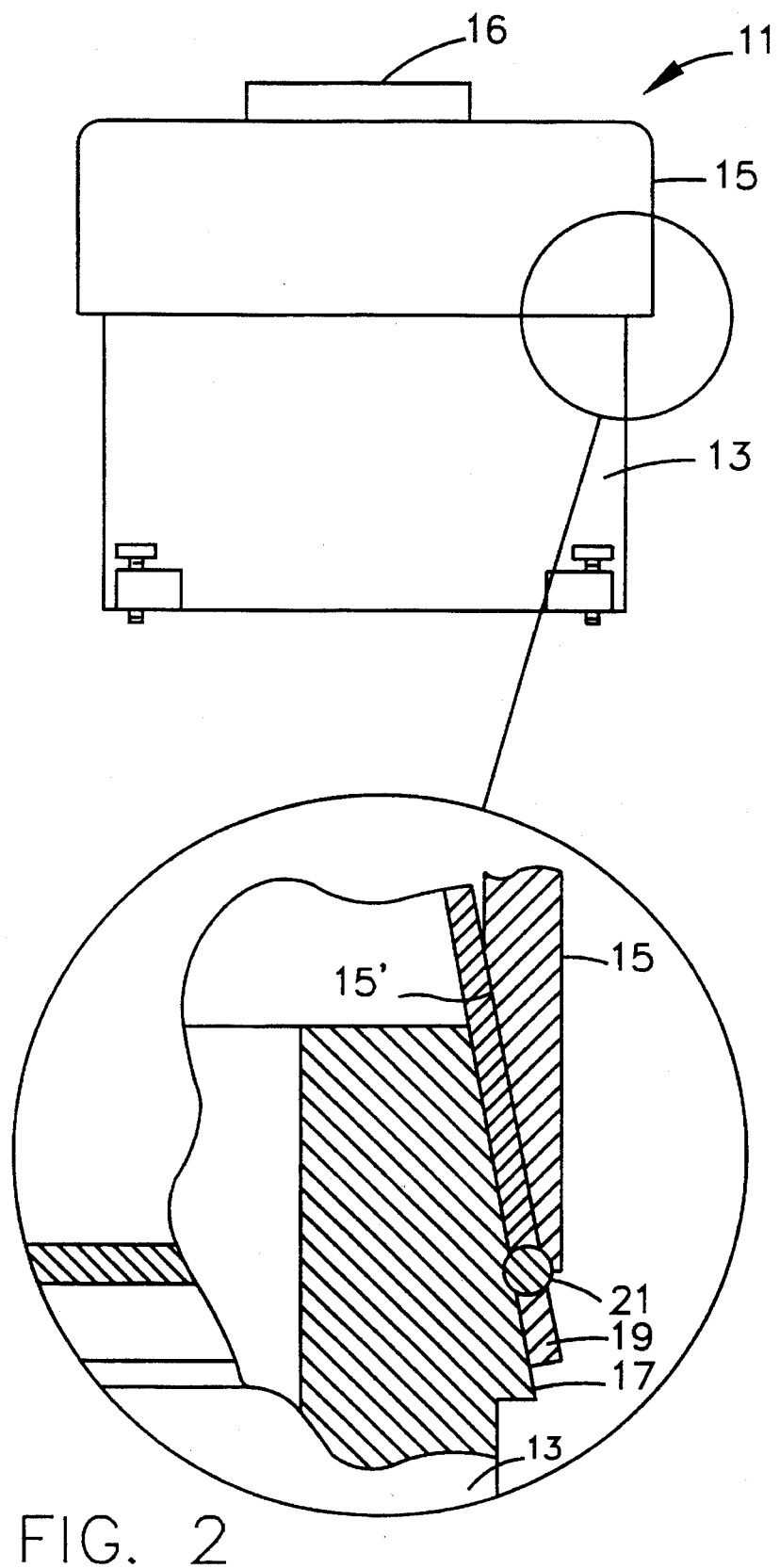
FIG. 2 is a view in side elevation of a hermetically sealed enclosure, housing or container consisting of a chassis body and a cover and including an enlarged detailed view, partly in section, of a hermetic seal construction per se or for the enclosure.

The preferred embodiment of the invention is best illustrated in FIG. 1a–1e and FIG. 2 wherein FIG. 1a–1e shows an exploded view of the enclosure 11 comprising chassis 13, cover 15, chassis tapered surface 17, and conical welded filler ring 19. FIG. 2 shows the enclosure 11 in a sealed assembled side elevation. A small circle on the side elevation of FIG. 2 designates the location of a detailed partial sectional view of the enclosure. The detailed partial sectional view is encircled within a large circle and positioned below the side elevation and linked to the side elevation by a line in the same view. The detailed partial sectional view of FIG. 2 shows the enclosure seal created between chassis 13 and cover 15 in detail. The conical weld filler ring 19 is shown positioned between the chassis tapered surface 17 and the ductile cover interior flared portion 15'. The enclosure seal is created by a laser weld 21. The laser weld 21 connects cover 15 to tapered surface 17 about the entire perimeter of tapered surface 17 to insure hermetic sealing.

Preferably, the cover 15 is wrought aluminum, the chassis 13 is cast aluminum and the weld filler ring 19 is cut or stamped from aluminum alloy sheet with a high percentage of silicon in it.

FIGS. 1a–1e show typical enclosure components in exploded relationship. Cover 15 includes hermetic electrical connector 16 having pins (not shown) for connection to a receiving socket carried by an electronics circuit card assembly 18 which in turn connects to instrument assembly 20. Weld filler ring 19 (if required) slips onto a tapered surface 17 to receive the ductile cover interior flared portion 15' (FIG. 2) to prevent cracking upon cooling. The conical weld filler ring 19 is used when the cover 15 is made of an aluminum alloy that does not have sufficient silicon to allow crack free laser welding to take place.

The assemblies 18 and 20 are not part of the invention but may comprise components worth e.g., $5,000–$35,000, such as gyros, accelerometers, medical devices, or the like, which require protection from contamination.

The unique design of the interface of FIG. 2 achieves the hermetic laser welds in aluminum, and allows the cover 15 to be removed, using a lathe tool to cut away the laser weld 21, so that the cover and chassis are reusable—and only the ring 19 is sacrificed. Since the enclosure may be used to protect expensive sensitive instruments and electronics, access for repair is vital. Also, the principles of this design may be applied to other configurations (i.e.) elliptical, pillow-shaped or the like, but circular, as depicted, is preferred. Other materials may be employed, and if laser weld cracking is not a problem, the filler ring 19 (FIG. 2) may be omitted, and the inner flared surface 15' of the cover 15 mated directly to the tapered surface 17 to avoid gaps, and maintain position while laser weld 21 is formed from the materials of cover 15 and tapered surface 17. Reuse is still possible above the original weld 21, or the sacrificial ring 19 may be employed.

Prior designs of laser welded enclosures consistently failed hermeticity testing. The leaks in the welds had to be patched with epoxy. This was a costly, time consuming process which also compromised the long term hermeticity of the enclosure. Also many welded enclosures cannot be reused after they are opened.

Aluminum does not weld easily and is particularly difficult to laser weld. Laser welding is desirable for the following reasons:

The heating is localized at the weld which permits the enclosure to be welded without damage to the delicate instruments and electronics installed inside.

The localized heating also precludes weld induced thermal distortion of the enclosure.

The laser welding process does not introduce flux or other contaminants into the enclosure.

The laser weld process lends itself to automation for high production rates and low cost.

The aluminum enclosure consists of the three parts: Cover 15, chassis 13 and weld filler ring 19 plus a plug and set screw to seal a purge and fill port (not shown) in the chassis 13.

The parts are designed for low cost fabrication and assembly processes. In the embodiment of the exploded enclosure 11 of FIGS. 1a–1e, the cover 15 is a drawn can fabricated from 0.040 inch thick 6061 aluminum alloy sheet. The chassis 13 is a casting fabricated from A356.0-T6 aluminum alloy. The weld filler ring 19 is fabricated from 0.010 inch thick 4047 aluminum alloy sheet. The overall dimensions of the enclosure 11 are 3.5 inches in diameter and 3.3 inches in height.

The features of the weld interface (FIG. 2) which combine to produce consistently good hermetic welds are the conical tapered surfaces of the mating parts, the ductility of the cover material and the combination of alloys. The parts of the enclosure are assembled by being pressed together to the final height dimension in an arbor press prior to welding. The interference fit on the conical surfaces creates positive contact pressure between the parts at the weld line which eliminates the problem of gaps and insures a hermetic weld. The ductility of the cover material permits it to be pressed down over the conical surface of the weld filler ring and chassis with modest force on the arbor press and without overstressing the cover.

Pressing the parts to the final dimension also eliminates the considerable stack-up of height tolerances inherent in the design. This allows reasonable manufacturing tolerances to be used on the parts without a height penalty on the final assembly. In the case of the depicted Inertial Measurement Unit enclosure, the stack-up of height tolerances is 0.120 inch before pressing the cover on to the 3.303 inch final assembled height dimension.

INTERFERENCE FIT ANALYSIS

The parts of the preferred embodiment enclosure are dimensioned to provide a minimum height interference of 0.020 inch when pressed together to the final assembled height dimension of 3.303 inches. The application of the manufacturing tolerances to the minimum interference part dimensions results in a maximum height interference of 0.140 inch.

Figure 3:
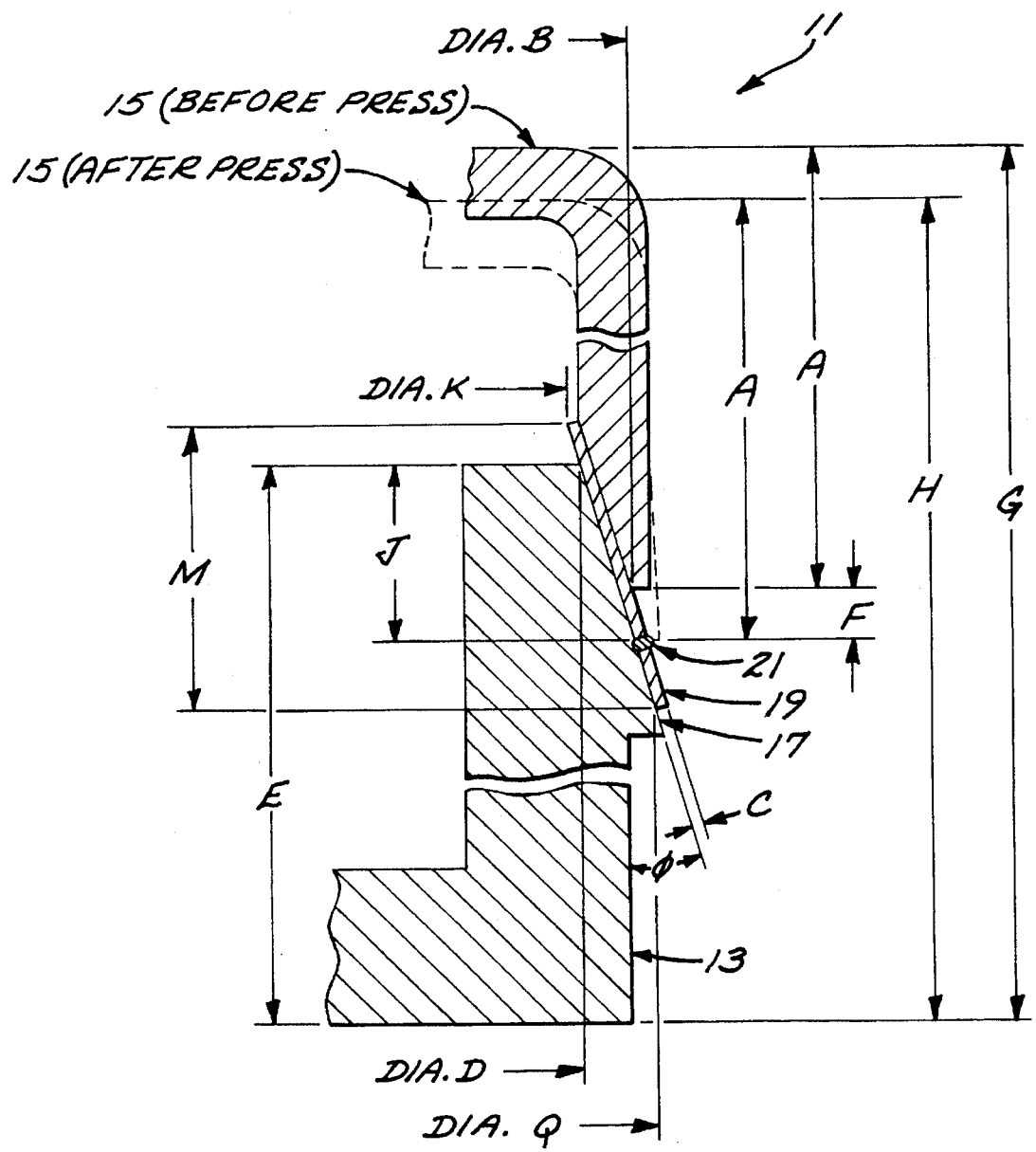
FIG. 3 is a schematic sectional view for interference fit analysis.

FIG. 3 is provided to explain an analysis of the design of the interference fit of the preferred embodiment. FIG. 3 illustrates the configuration of the interference fit. The cone angle $\phi$ on the enclosure parts is 4.574°. The parts are designed for a minimum height interference of Fmin of 0.020 inch when pressed together to the final assembled enclosure height H. Based on development tests, the minimum allowable interference of 0.020 inch is required to insure a tight, gap-free fit at the weld line for a consistently hermetic weld and to provide adequate friction to hold the enclosure parts together during the laser welding process. To accommodate the size, shape and mounting requirements of the contents of the enclosure 11, the final assembled height H is 3.303 inches, the minimum chassis height Emin is 2.302 inches and Dmin, the minimum chassis diameter at the top of the taper, is 3.399 inches. The ring 19 is fabricated from 4047 aluminum alloy sheet which is available in 0.010±0.001 inch thickness. For a worst case minimum height interference analysis, the minimum ring thickness Cmin 0.009 inch is used. For the worst case minimum interference analysis, Amin the minimum cover height and Bmax the maximum cover diameter at the bottom of the taper are used. The minimum cover height Amin is calculated to place the weld line 21 a distance Jmin of 0.220 below the top of the chassis 13. Since approximately 0.020 inch is cut off the bottom of the cover each time it is removed, this distance permits the cover to be removed and rewelded several times.

1. $A_{min} = H + E_{min}$
2. $A_{min} = 3.303 + 0.220 - 2.302 = 1.221$ inches

The maximum cover diameter $B_{max}$ for the minimum allowable interference $F_{min}$ of 0.020 inch is calculated as follows:

3. $B_{max} = D + 2[(J - F)\tan\phi + C/\cos\phi]$
4. $B_{max} = 3.399 + 2[(0.220 - 0.020)\tan 4.574° + 0.009/\cos 4.574°]$
5. $B_{max} = 3.449$ inches To calculate the part dimensions for the maximum interference fit the manufacturing tolerances of the embodiment enclosure are applied to the parts as follows:

6. $A_{max} = A_{min} + \text{tolerance}$
7. $A_{max} = 1.221 + 0.010 = 1.231$ inches
8. $B_{min} = B_{max} - \text{tolerance}$
9. $B_{min} = 3.449 - 0.006 = 3.443$ inches
10. $C_{max} = C_{min} + \text{tolerance}$
11. $C_{max} = 0.009 + 0.002 = 0.011$ inch
12. $D_{max} = D_{min} - \text{tolerance}$
13. $D_{max} = 3.399 + 0.006 = 3.405$ inches
14. $E_{max} = E_{min} + \text{tolerance}$
15. $E_{max} = 2.302 + 0.010 = 2.312$ inches The maximum interference fit $F_{max}$ is then calculated as follows:
16. $F_{max} = G_{max} - H$ Where $G_{max}$ is the maximum assembled enclosure height before press and H is the final assembled height after press.

17. $G_{max} = A_{max} + E_{max} + C_{max}/\sin\phi - [(B_{min} - D_{max})/2(\tan\phi)]$
18. $G_{max} = 1.231 + 2.312 + 0.011/\sin 4.574° - [(3.443 - 3.4055)2(\tan 4.574°)]$
19. $G_{max} = 3.443$ inches
20. $F_{max} = 3.443 - 3.303 = 0.140$ inch The maximum circumferential elongation of the bottom of the cover at the maximum interference is:

21. $\text{Elongation} = 100 (2) (F_{max})\tan\phi / B_{min}$
22. $\text{Elongation} = 100 (2) (0.140)(\tan 4.574°)/3.443 = 0.65\%$ This is well below the 10% allowable elongation of the 6061-t6 aluminum alloy cover material.

$J_{max}$ is the distance from the top of the chassis 13 to the weld line 21 at the maximum interference fit.

23. $J_{max} = A_{max} + E_{max} - H$
24. $J_{max} = 1.231 + 2.312 - 3.303 = 0.240$ inch Design criteria for weld filler ring 10 with reference to FIG. 3:

1) The worst case location of the top of the ring to be flush to top of chassis. In the opposite extreme of tolerances the top of the ring will be above the top of the chassis; and,
2) The worst case location of the bottom of the ring to be 0.040 minimum below the bottom of the cover.

The maximum inside diameter, $K_{max}$, at the top of the ring is made equal to the minimum diameter $D_{min}$ at the top of the chassis to satisfy the first criteria.

25. $K_{max} = D_{min} = 3.399$ inches

To satisfy the second criteria the nominal height of the ring $M_{nom}$ is calculated as follows:

26. $Q_{min} = D_{max} + 2(J_{max} + 0.040)\tan\phi$

Where $Q_{min}$ is the minimum inside diameter of the bottom of the ring.

27. $Q_{min} = 3.405 + 2(0.240 + 0.040)\tan 4.574°$

28. $Q_{min} = 3.450$ inches

To calculate the nominal diameters, the tolerances are applied as follows:

29. $K_{nom} = K_{max} - (\text{tolerance}/2)$
30. $K_{nom} = 3.399 - (0.006/2) = 3.396$ inches
31. $Q_{nom} = Q_{min} + (\text{tolerance}/2)$
32. $Q_{nom} = 33.450 + (0.006/2) = 3.453$ inches
33. $M_{nom} = (Q_{nom} - K_{nom})/2(\tan\phi)$
34. $M_{nom} = (3.453 - 3.396)/2(\tan 4.574°)$
35. $M_{nom} = 0.356$ inch*

*note: $M_{nom}$ was rounded up to 0.360 inch for the ring layout described herein. This adds some margin to the 0.040 minimum for the worst case location of the bottom of the ring below the bottom of the cover.

The cover can be removed by fixturing the assembly on a lathe and cutting through the welded bottom edge of the cover and through or partially through the weld filler ring. A wheel puller type fixture is then used to pull the cover off. The weld filler ring is then peeled off the chassis and discarded and the chassis surface is dressed.

Approximately 0.020 inch of the cover height is removed to cut through the weld. The conical taper interface between the cover and the chassis is approximately 0.23 inch long. This permits the cover to be removed and rewelded several times. Each time the cover is rewelded, the weld line moves up the chassis by the amount removed from the height of the cover. The chassis can be reused indefinitely. A new weld filler ring is required for each weld.

Further details of construction include the manner of making laser weld 21. The ring 19 sheet material is available from Lucas Milhaupt in Cudahy, Wis. as 13/87 silicon aluminum alloy sheet.

A suitable laser welding machine may be obtained from Humonics, coherent or others characterized by a pulsed Nd YAG laser capable of up to 150 watts average power, set to pulse at about 20 pulses per second at a power setting of 1 joule per pulse. (This setting may require less than 100 watts). A computer simply guides the laser at the weld area (21) while a collar machine tool chuck rotates the assembled enclosure 11. In the preferred example, the diameter at weld 21 is approximately 3.5 inches, and the speed of welding is about 6 inches per minute. Thus the creation of weld 21 requires almost 2 minutes. The weld 21 is really a series of overlapping spots due to the laser pulses, but a hermetic seal is produced.

FIGS. 3–6 explain how the conical ring 19 is produced to mate with tapered surface 17, and how the inner outwardly extending flange 15' of cover 15 is achieved to mate with the outer surface of ring 19.

Figure 4:
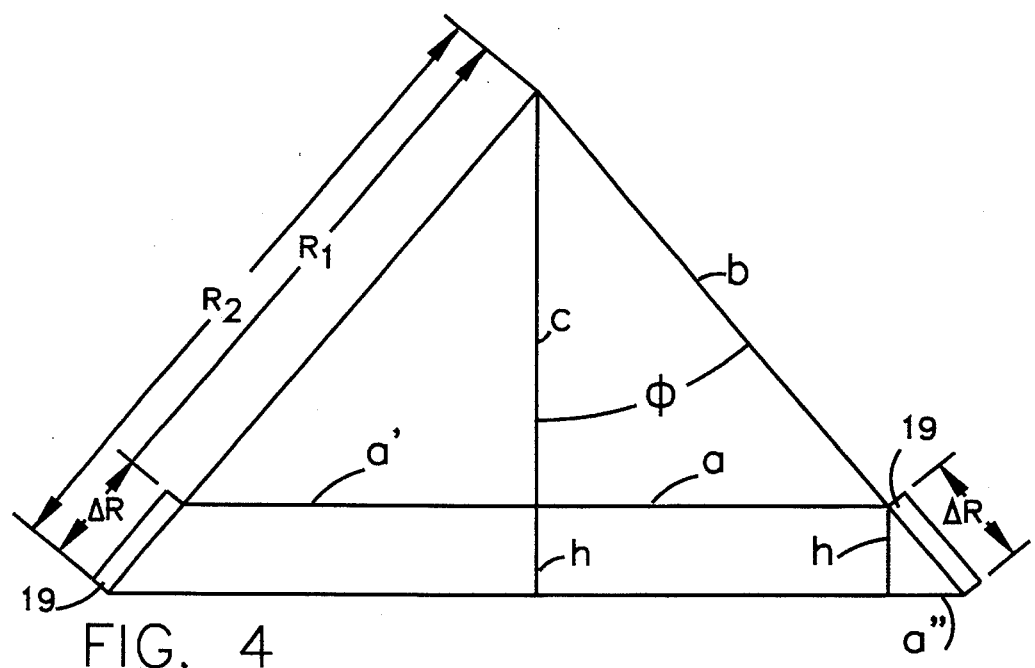
FIG. 4 shows the weld filler ring as a section of a cone to explain a method of making the conical ring from a flat sheet of material.

In FIG. 4, it is known that the slope angle $\phi$ of ring 19 is 4.574; the top inside diameter (ID) or a+a' is 3.396 inches, and that the desired height of ring 19 is 0.3592 inches. In order to lay out the ring 19 on flat sheet material, it is then necessary to determine R, $\Delta R$, $R_2$ angle $\Theta$ and the length L of the inside arc of the layout for ring 19. FIG. 4 is a section through a cone formed by extending ring 19 upwardly to its apex. This forms right angle triangle a, b, c, and h $\Delta R$, a".

To find the length of $R_1$, use $\sin 4.574 = a/b$ or $R_1 = 1.698/\sin 4.574$ so that $R_1 = 21.2924$ inches.

To determine $\Delta R$, use $\cos 4.574 = h/\Delta R$ or $\Delta R = 0.3592/\cos 4.574 = 0.3603$ inches.

To determine $R_2$ use $R_2 = R_1 + \Delta R$ or $21.2924 + 0.3603476 = 21.6527$ inches.

To determine L use $L = \pi d = \pi(1.698 + 1.698) = 10.6688$ inches.

To determine the circumference $(C) = 2\pi R_1$, use $C = 2\pi(21.2924) = 133.7843$ inches.

Then, $\Theta/360 = L/C = 10.6688/133.7843$ or $\Theta = 28.7087°$.

Figure 5:
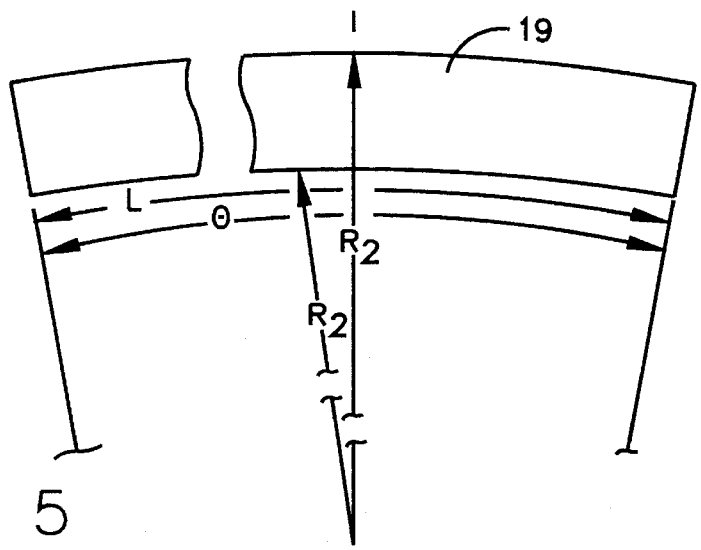
FIG. 5 shows the layout shape of the conical ring on flat material.
Figure 6:
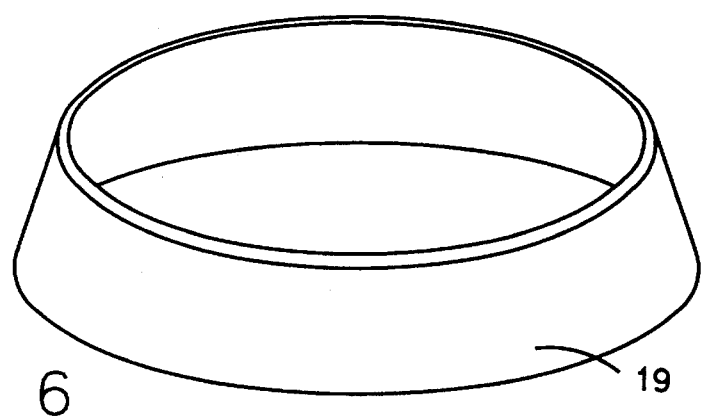
FIG. 6 is an isometric view of the ring.

Thus, in FIG. 5, L, $R_1$ and $R_2$ are known to layout ring 19, which is cut or stamped out and its ends laser welded together to form conical ring 19 of FIG. 6.

Figure 7:
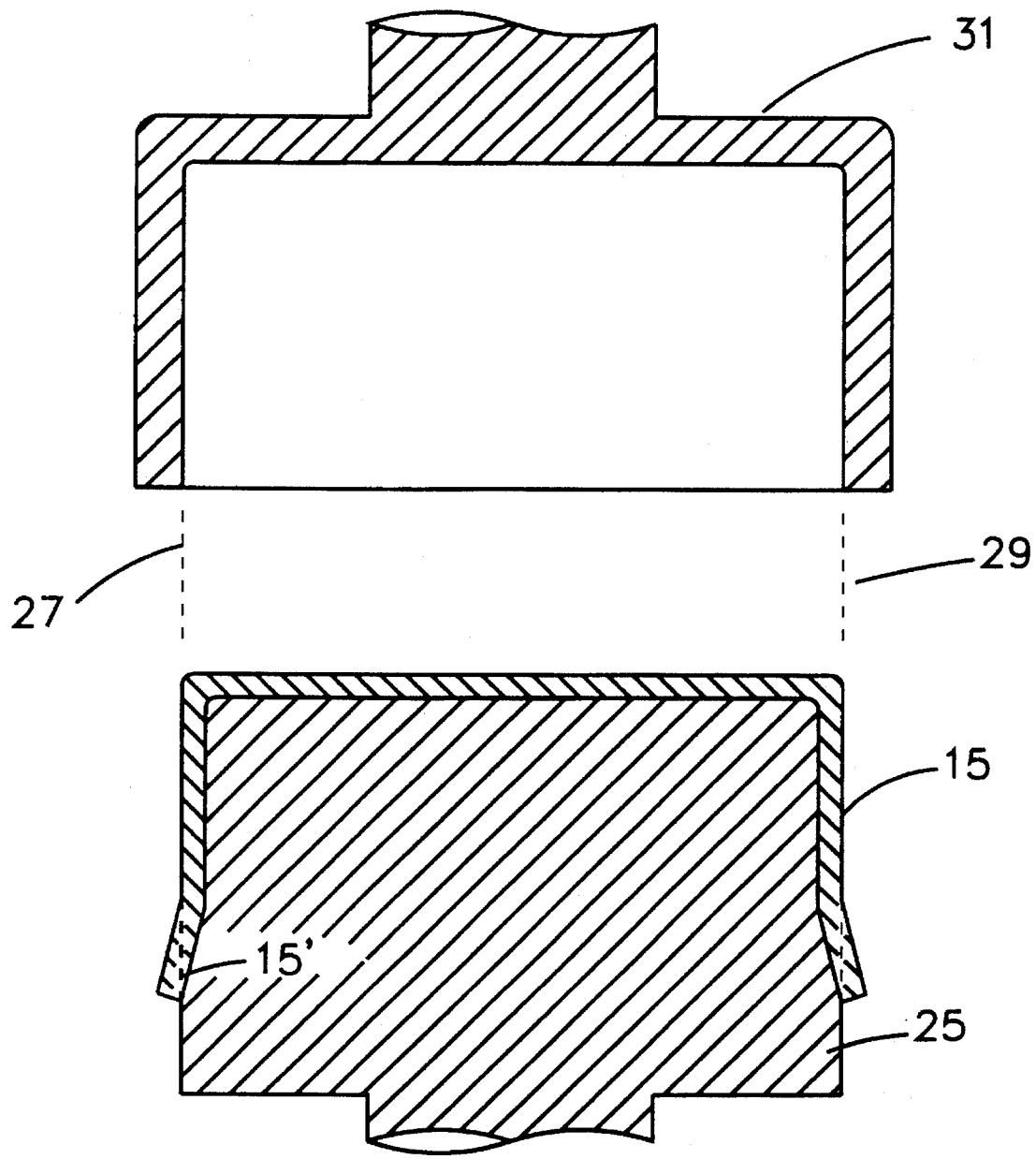
FIG. 7 shows the cover formed on a male die which is flared outwardly so that a pinch-off die cutter can remove the external portion of the flare flush to the external cylindrical surface of the cover and automatically form an internal flare in the cover mating portion without secondary machining operations.

In FIG. 7, the inside flare 15' for cover 15 to match the ring 19 or to surface 17 slope is obtained by using male die 25 incorporating the lower flare, and then pinch-off die 31 punching along vertical lines 27, 29 at the outer edge of the cover 15 periphery.

When the enclosure 11 is to form an aluminum weld 21, it is only necessary that sloped or tapered portion 17, ring 19 and the overlapping mouth of cover 15 be appropriate aluminum alloys, as explained but usually the total parts will be aluminum alloys.

What is claimed is:

1. A hermetically sealed reusable enclosure for protecting expensive delicate heat sensitive components comprising in combination:

a chassis having an open mouth, but otherwise being closed;

a tapered external surface integral with the chassis about the mouth;

a weld filler ring tightly about a peripheral portion of said tapered external surface;

a ductile cover having an open internally tapered mouth for receiving the mouth of the chassis and pressing the ring against the peripheral portion of said tapered external surface to establish an interference fit; and, a laser weld connecting the cover mouth, ring and the tapered external surface to effect a hermetic seal around the tapered external surface.

2. The enclosure of claim 1, wherein the open mouth of the chassis is circular.

3. The enclosure of claim 2, wherein the weld filler ring is conical shaped to mate with the tapered external surface of the chassis.

4. The enclosure of claim 3, wherein the cover is closed except for its mouth which is tapered to fit the taper of the tapered external surface.

5. The enclosure of claim 4, wherein a small portion of the weld filler ring is alloyed with a small portion of the cover and the chassis in the laser weld.

6. The enclosure of claim 1, wherein at least the tapered external surface of the chassis is A356.0-T65 aluminum alloy, the weld filler ring is 4047 aluminum alloy and at least the cover mouth is 6061 aluminum alloy.

7. The enclosure of claim 5 wherein the cover is a drawn can of 6061 aluminum alloy sheet, the chassis is a casting of A356.0-T6 aluminum alloy, and the weld filler ring is 4047 aluminum alloy sheet.

8. A hermetically sealed reusable light weight enclosure for protecting heat sensitive components comprising, in combination:

a substantially cup-shaped chassis having an open circular mouth, a closed bottom and a continuous wall between the bottom and mouth;

a tapered conical external surface around and integral with the wall adjacent to the mouth sloping inwardly toward the mouth of the chassis;

a conical shaped weld filler ring conforming to a circumferential portion of the tapered external surface and tightly fit thereon;

a closed ductile cover having an open mouth for receiving a portion of the tapered external surface and ring adjacent thereto;

said mouth and adjacent portion of the cover being internally conically flared outwardly in the direction of the chassis to match the slope of the tapered external surface and adjacent weld filler ring whereby the cover, ring and tapered external surface are wedged together in an interference fit with an end of the ring extending beyond the cover mouth, but falling short of the end of the tapered external surface thereby exposing the juxtaposed flared portion of the cover and weld filler ring; and, a laser weld connecting the cover mouth, ring and tapered external surface of the chassis to effect a hermetic seal around the tapered surface which is leak proof under $3 \times 10^{-10}$ cc He/sec. at one atmosphere pressure differential.

9. The enclosure of claim 8 wherein the cover is a drawn can of 6061 aluminum alloy sheet, the chassis is a casting of A356.0-T6 aluminum alloy, and the weld filler ring is from 4047 aluminum alloy sheet, including a percentage of silicon.

10. The method of making a reusable hermetically sealed enclosure for delicate expensive heat sensitive aircraft components comprising the following steps:

forming a closed chassis having an open mouth;

forming a tapered conical external surface on the chassis about the mouth;

placing a conical weld filler ring tightly about the tapered conical external surface;

forming a closed ductile cover having an open mouth to fit about the ring including a tapered internal conical surface;

pressing the cover onto the ring and chassis to establish an interference fit so that the conical cover surface overlies the conical ring which overlies the conical external surface; and laser welding the cover mouth, ring, and the tapered external surface together to effect a hermetic seal around the tapered external surface.

11. The method of claim 10, comprising the steps of:

drawing the cover in can shape, from 6061 aluminum alloy sheet;

casting the chassis from A356.0-T6 aluminum alloy; and cutting the weld filler ring from 4047 aluminum alloy sheet including a percentage of silicon.

12. A hermetically sealed enclosure of material other than aluminum capable of protecting heat sensitive components comprising in combination:

a chassis having an open mouth, but otherwise being closed;

an integral conical external surface on the chassis about the mouth;

a ductile cover having an open mouth and an internally flared conical portion for receiving the mouth of the chassis and a portion of the external conical surface and pressing the cover conical surface against said tapered external surface to form an interference fit; and, a laser weld connecting the cover portion, and the tapered external surface to effect a hermetic seal around the tapered external surface.

* * * * *